(12) United States Patent
Ha et al.

(10) Patent No.: US 12,195,820 B2
(45) Date of Patent: Jan. 14, 2025

(54) PLATED STEEL SHEET HAVING EXCELLENT STRENGTH, FORMABILITY AND SURFACE QUALITY, AND MANUFACTURING METHOD THEREFOR

(71) Applicant: POSCO CO., LTD, Pohang-si (KR)

(72) Inventors: Yu-Mi Ha, Gwangyang-si (KR); Jun-Sung Yeom, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/036,876

(22) PCT Filed: Nov. 10, 2021

(86) PCT No.: PCT/KR2021/016314
§ 371 (c)(1),
(2) Date: May 12, 2023

(87) PCT Pub. No.: WO2022/108219
PCT Pub. Date: May 27, 2022

(65) Prior Publication Data
US 2023/0407429 A1  Dec. 21, 2023

(30) Foreign Application Priority Data

Nov. 18, 2020  (KR) .................... 10-2020-0154600

(51) Int. Cl.
*C21D 9/46* (2006.01)
*B32B 15/01* (2006.01)
(Continued)

(52) U.S. Cl.
CPC .............. *C21D 9/46* (2013.01); *B32B 15/013* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS 4,883,544 A * 11/1989 Ueda .................... C21D 8/0205
148/609
9,340,860 B2  5/2016 Furuhashi et al.
(Continued)

FOREIGN PATENT DOCUMENTS

CN     107949652 A    4/2018
EP     3348661        7/2018
(Continued)

OTHER PUBLICATIONS

Japanese Office Action—Japanese Application No. 2023-529070 issued on May 28, 2024, citing JP 2008-214700, JP 2008-214656, WO 2012/073538, JP 2007-216247, JP 2006-342412, JP 2009-108373, and JP H05-228501.
(Continued)

*Primary Examiner* — Seth Dumbris
(74) *Attorney, Agent, or Firm* — CANTOR COLBURN LLP (57) ABSTRACT

Provided is a plated steel sheet and a method for manufacturing the same, and more particularly, to a zinc-based plated steel sheet having high strength and high formability that may be suitably applied as a material for an automotive outer panel and a method for manufacturing the same.

7 Claims, 2 Drawing Sheets

(51) Int. Cl.
*C21D 6/00* (2006.01)
*C21D 8/02* (2006.01)
*C22C 18/00* (2006.01)
*C22C 38/00* (2006.01)
*C22C 38/02* (2006.01)
*C22C 38/04* (2006.01)
*C22C 38/06* (2006.01)
*C22C 38/12* (2006.01)
*C22C 38/14* (2006.01)
*C22C 38/16* (2006.01)
*C23C 2/06* (2006.01)
*C23C 2/28* (2006.01)
*C23C 2/40* (2006.01)

(52) U.S. Cl.
CPC ........... *C21D 8/0205* (2013.01); *C21D 8/021* (2013.01); *C21D 8/0226* (2013.01); *C21D 8/0236* (2013.01); *C21D 8/0263* (2013.01); *C21D 8/0278* (2013.01); *C22C 18/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C23C 2/06* (2013.01); *C23C 2/28* (2013.01); *C23C 2/40* (2013.01)

(56) References Cited

U.S. PATENT DOCUMENTS

| | | | |
|---|---|---|---|
| 9,702,031 | B2 | 7/2017 | Akamatsu et al. |
| 2002/0189399 | A1* | 12/2002 | Grubb ..................... C21D 1/26 75/10.25 |
| 2010/0104890 | A1 | 4/2010 | Satoh et al. |
| 2015/0203948 | A1 | 7/2015 | Sugiura et al. |
| 2019/0177823 | A1* | 6/2019 | Matsuo ................... C22C 38/54 |

FOREIGN PATENT DOCUMENTS

| | | | |
|---|---|---|---|
| JP | H05228501 A | | 9/1993 |
| JP | 2001342541 A | | 12/2001 |
| JP | 2004169160 | | 6/2004 |
| JP | 2004244665 | | 9/2004 |
| JP | 2006342412 A | | 12/2006 |
| JP | 2007216247 | | 8/2007 |
| JP | 2008214656 A | | 9/2008 |
| JP | 2008214700 A | | 9/2008 |
| JP | 2008231447 | | 10/2008 |
| JP | 2009108373 A | | 5/2009 |
| JP | 2009209382 | | 9/2009 |
| JP | 2009249715 | | 10/2009 |
| JP | 2011246767 | | 12/2011 |
| JP | 2011246767 A | * | 12/2011 |
| JP | 5079795 | | 11/2012 |
| KR | 20150029741 | | 3/2015 |
| KR | 20180038019 | | 4/2018 |
| WO | 2012073538 A1 | | 6/2012 |

OTHER PUBLICATIONS

International Search Report—PCT/KR2021/016314 dated Feb. 21, 2022.

Chinese Office Action—Chinese Application No. 202180077592.5 issued on Nov. 14, 2024, citing JP 2011-246767, CN 107949652, JP 2009-209382, JP 2004-244665, and JP 2001-342541.

* cited by examiner

PLATED STEEL SHEET HAVING EXCELLENT STRENGTH, FORMABILITY AND SURFACE QUALITY, AND MANUFACTURING METHOD THEREFOR

TECHNICAL FIELD

The present disclosure relates to a plated steel sheet having excellent strength, formability, and surface quality that may realize a weight reduction of an automobile and a method for manufacturing the same, and more particularly, to a zinc-based plated steel sheet having high strength and high formability that may be suitably applied as a material for an automotive outer panel and a method for manufacturing the same.

BACKGROUND ART

A cold-rolled steel sheet processed by press processing or the like is used as a material for an automotive outer panel, and high formability is generally required therein. Recently, in carbon dioxide emission regulations, from the viewpoint of preventing global warming, a new target for improving automobile fuel costs has been set, and there is a demand for improving fuel efficiency of an automobile such as introduction of a preferential tax system for a low fuel consumption automobile. A weight reduction of an automobile body is an effective means for improving fuel efficiency of the automobile. From the viewpoint of such a weight reduction, slimming of a steel sheet for an automobile body has been required. However, recently, an increasing number of automobile companies are trying to reduce costs by realizing a weight reduction and process shortening through omission of reinforcing parts using high strength despite a thick thickness.

As a steel sheet for an automobile body that satisfies the requirements for increasing the strength of the steel sheet and is pressed into a complex shape, a high-strength zinc-based steel sheet having an excellent surface appearance and excellent press formability has been required.

Meanwhile, in a high-strength steel sheet for an automobile, in order to improve the strength of the steel sheet, incorporation of solid solution strengthening elements such as Si, Mn, and P into steel has been performed.

In particular, P is added to the steel in order to increase the strength of the steel sheet. However, P is an element that is very easily segregated. P segregated on a surface of a slab is stretched in a longitudinal direction of the steel sheet by hot rolling and cold rolling, and P segregation is formed on a surface of a coil. In such P segregation, alloying is delayed during plating, which causes linear defects in the alloyed hot-dip galvanized steel sheet. As a method for manufacturing an alloyed hot-dip galvanized steel sheet using a steel sheet having a content of P of 0.03% or more as a base material for this problem, a method in which a surface of the steel sheet is ground at a grinding amount according to the amount of P in the steel and an alloying treatment is performed in an alloying furnace in an induction heating system has been proposed in order to eliminate unevenness of the surface of the steel sheet (Patent Document 1).

In such a related art, in order to prevent the linear defects in the alloyed hot-dip galvanized steel sheet, for example, in a case in which an ultra-low carbon Ti-added steel sheet having a content of P of 0.03% or more is used, the surface has been subjected to a scarfing treatment to a thickness of 3 mm or more in a continuous casting process, and the surface has been ground to a thickness of 5 μm or more in a steel sheet stage before plating. Accordingly, the surface quality is secured by preventing the occurrence of shape defects after plating, but these methods cause a decrease in yielding percentage.

(Patent Document 1) Japanese Patent Laid-Open Publication No. 2004-169160

DISCLOSURE

Technical Problem

An aspect of the present disclosure is to provide a plated steel sheet having a high yield percentage, an excellent surface appearance, high strength, and high formability, and a method for manufacturing the same.

An object of the present disclosure is not limited to the above description. Those skilled in the art to which the present disclosure pertains will have no difficulties in understanding additional objects of the present disclosure from the general contents of the specification of the present disclosure.

Technical Solution

According to an aspect of the present disclosure, a plated steel sheet includes: a base steel sheet; and
  a plating layer formed on the base steel sheet,
  wherein the base steel sheet contains, by wt %, 0.003 to 0.009% of C, 0.05% or less of Si, 0.4 to 1.0% of Mn, 0.04 to 0.09% of P, 0.01% or less of S, 0.005% or less of N, 0.1% or less of S·Al, 0.03 to 0.08% of Mo, 0.005 to 0.03% of Ti, 0.02 to 0.045% of Nb, 0.06 to 0.15% of Cu, 0.003% or less of B, and a balance of Fe and unavoidable impurities, and
  the plated steel sheet satisfies the following Relational Expression 1:

$$1.6 \leq Mt/Ms \leq 6 \qquad \text{[Relational Expression 1]}$$

(in Relational Expression 1, Mt represents an average content wt % of Mo at a point spaced apart from a surface of the base steel sheet in a thickness direction of the base steel sheet by 0.1 μm, Ms represents an average content wt % of Mo at a ¼t point from the surface of the base steel sheet in the thickness direction of the base steel sheet, and t represents a total average thickness of the base steel sheet and is in a range of 0.8 to 1 mm).

According to another aspect of the present disclosure, a method for manufacturing a plated steel sheet includes:
  performing continuous casting on steel containing, by wt %, 0.003 to 0.009% of C, 0.05% or less of Si, 0.4 to 1.0% of Mn, 0.04 to 0.09% of P, 0.01% or less of S, 0.005% or less of N, 0.1% or less of S·Al, 0.03 to 0.08% of Mo, 0.005 to 0.03% of Ti, 0.02 to 0.045% of Nb, 0.06 to 0.15% of Cu, 0.003% or less of B, and a balance of Fe and unavoidable impurities;
  reheating a slab obtained by the continuous casting;
  providing a hot-rolled steel sheet by hot rolling the reheated slab;
  coiling the hot-rolled steel sheet;
  providing a cold-rolled steel sheet by cold rolling the hot-rolled steel sheet;
  annealing the cold-rolled steel sheet; and
  hot-dip galvanizing the annealed cold-rolled steel sheet by immersing the annealed cold-rolled steel sheet in a zinc-based plating bath, wherein the continuous casting satisfies the following Relational Expression 3:

$$1 \leq Vc \leq 5 - [P]/[Mo] \quad \text{[Relational Expression 3]}$$

(in Relational Expression 2, Vc represents an average casting velocity during the continuous casting and a unit thereof is m/min, [P] represents an average content wt % of P in the slab, and [Mo] represents an average content wt % of Mo in the slab).

Advantageous Effects

As set forth above, according to an aspect of the present disclosure, it is possible to provide a plated steel sheet having a high yield percentage, an excellent surface appearance, high strength, and high formability, and a method for manufacturing the same.

The various and beneficial advantages and effects of the present disclosure are not limited to the above description, and may be more easily understood in the description of specific exemplary embodiments in the present disclosure.

BEST MODE FOR INVENTION

Hereinafter, preferred exemplary embodiments in the present disclosure will be described. However, the exemplary embodiments in the present disclosure may be modified in many different forms and the scope of the present disclosure is not limited to exemplary embodiments described below. In addition, the exemplary embodiments in the present disclosure are provided to further completely describe the present disclosure to those skilled in the art.

As described above, in the related art, in order to prevent linear defects in a plated steel sheet and secure surface quality, it is required to subject the surface to a scarfing treatment in a continuous casting process and to subject the surface to a grinding treatment in a steel sheet stage before plating, which causes a decrease in yielding percentage.

Therefore, as a result of conducting intensive studies to solve the problems of the related art, the present inventors have confirmed that formability may be secured through minimization of solid solution elements such as carbon (C), nitrogen (N), and sulfur (S) by adding an appropriate amount of titanium (Ti) and/or niobium (Nb) as a strong carbonitride forming element to steel. In addition, at the same time as described above, the present inventors have confirmed that a high-strength and high-formability plated steel sheet for an automotive outer panel having a tensile strength of 390 MPa or more and excellent surface quality may be manufactured by adding an appropriate amount of phosphorus (P), molybdenum (Mo), and the like to steel, thereby completing the present disclosure.

Hereinafter, a plated steel sheet having excellent surface quality, high strength, and high formability that may be preferably applied as a material for an automotive outer panel and a method for manufacturing the same of the present disclosure will be described. In this case, a plated steel sheet for an automotive outer panel should satisfy press formability such as deep drawability as well as a high tensile strength.

As a scale-removed rolled steel sheet used as a base material (base steel sheet) of the plated steel sheet according to the present exemplary embodiment, a high-strength steel sheet in which ultra-low carbon steel is used as a basic component and an appropriate amount of reinforcing elements such as Mn and P is added is used in order to improve workability.

That is, a plated steel sheet according to an aspect of the present disclosure includes a base steel sheet; and a plating layer formed on the base steel sheet. In this case, the base steel sheet contains, by wt %, 0.003 to 0.009% of C, 0.05% or less of Si, 0.4 to 1.0% of Mn, 0.04 to 0.09% of P, 0.01% or less of S, 0.005% or less of N, 0.1% or less of S·Al, 0.03 to 0.07% of Mo, 0.005 to 0.03% of Ti, 0.02 to 0.045% of Nb, 0.06 to 0.15% of Cu, 0.003% or less of B, and a balance of Fe and unavoidable impurities. Hereinafter, the reason for adding the basic component elements of the base steel sheet and the reason for limiting the contents will be described in detail.

Carbon (C): 0.003 to 0.009%

C is an interstitial solid solution element, and has a significant influence on formation of a texture of the steel sheet during hot rolling and annealing processes. When the amount of solid solution carbon in the steel is increased, a growth of grains having a {111} γ-fiber texture, which is advantageous for drawing workability, is suppressed, and a growth of grains having {110} and {100} textures is promoted, such that drawability of an annealed sheet is deteriorated. Furthermore, when a content of C exceeds 0.009%, a content of Ti and Nb required for precipitating C as carbide is increased, which may be disadvantageous in terms of economical efficiency, and pearlite and the like are formed, which may deteriorate formability. Therefore, it is preferable to limit the content of C to 0.009% or less. In addition, when the content of C is less than 0.003%, sufficient strength may not be secured. Therefore, it is preferable to limit the content of C to 0.003% or more. Meanwhile, more preferably, a lower limit of the content of C may be 0.0038%, or an upper limit of the content of C may be 0.008%.

Silicon (Si): 0.05% or less (excluding 0%)

Si is an element that contributes to an increase in strength by solid solution strengthening. Since Si should be necessarily added in order to exhibit the effect of increasing strength by such solid solution strengthening, a content of Si in the base steel sheet is limited to more than 0%. However, when the content of Si exceeds 0.05%, surface scale defects are caused, resulting in deterioration of plating surface properties. Therefore, in the present disclosure, the content of Si is managed to 0.05% or less. Meanwhile, more preferably, a lower limit of the content of Si may be 0.024%, or an upper limit of the content of Si may be 0.042%.

Manganese (Mn): 0.4 to 1.0%

Mn is a solid solution strengthening element, contributes to increasing strength, and serves to precipitate S in steel as MnS. When a content of Mn is less than 0.4%, strength may be decreased, whereas when the content of Mn exceeds 1.0%, surface problems due to oxides may occur. Therefore, it is preferable to limit the content of Mn to 0.4 to 1.0%. Meanwhile, more preferably, a lower limit of the content of Mn may be 0.48%, or an upper limit of the content of Mn may be 0.67%.

Phosphorus (P): 0.04 to 0.09%

P is the most effective element to secure strength of steel while having the most excellent solid solution effect and not significantly deteriorating drawability. When a content of P is less than 0.04%, it is impossible to secure the desired strength, whereas when the content of P exceeds 0.09%, secondary brittleness and surface streak defects may occur due to P segregation. Therefore, it is preferable to limit the content of P to 0.04 to 0.09%. Meanwhile, more preferably, a lower limit of the content of P may be 0.048%, or an upper limit of the content of P may be 0.089%.

Molybdenum (Mo): 0.03 to 0.08%

Mo is an element having high affinity with phosphorus (P), and serves to suppress P segregation. In order to secure high strength in ultra-low carbon steel, P should be used inevitably, and Mo may be appropriately added to partially contribute to preventing surface defects caused by P segregation. When a content of Mo is less than 0.03%, there is no significant effect on the desired surface improvement. In addition, when the content of Mo exceeds 0.08%, cost competitiveness is reduced due to high price. Therefore, it is preferable to limit the content of Mo to 0.03 to 0.08%. Meanwhile, more preferably, a lower limit of the content of Mo may be 0.05%, or an upper limit of the content of Mo may be 0.078%.

Sulfur (S): 0.01% or less (excluding 0%), Nitrogen (N): 0.005% or less (excluding 0%)

S and N are inevitably added as impurities present in steel, and therefore, contents of S and N in the base steel sheet each independently exceed 0%. However, in order to secure excellent welding properties, it is preferable to control the contents as low as possible. Therefore, the content of S is controlled to 0.01% or less, and the content of N is managed to 0.005% or less. Meanwhile, more preferably, a lower limit of the content of S may be 0.0015%, or an upper limit of the content of S may be 0.0034%. In addition, more preferably, a lower limit of the content of N may be 0.0008%, or an upper limit of the content of N may be 0.004%.

Aluminum (Al): 0.1% or less (excluding 0%)

Al precipitates AlN and contributes to improving drawability and ductility of steel. In order to exhibit the effect of improving drawability and ductility, a content of Al in the base steel sheet exceeds 0%. However, when the content of Al exceeds 0.1%, internal defects in the steel sheet may occur due to excessive formation of Al inclusions during a steelmaking process. Therefore, it is preferable to limit the content of Al to 0.1% or less. Meanwhile, more preferably, a lower limit of the content of Al may be 0.025%, or an upper limit of the content of Al may be 0.08%.

Titanium (Ti): 0.005 to 0.03%

Ti is an element that significantly contributes to improving drawability of the steel sheet by reacting with solid solution carbon and solid solution nitrogen during hot rolling to precipitate Ti-based carbonitrides. When a content of Ti is less than 0.005%, carbonitrides may not be sufficiently precipitated, which causes deterioration of drawability. On the other hand, when the content of Ti exceeds 0.03%, it is difficult to manage inclusions during a steelmaking process, which may cause inclusion defects. Therefore, it is preferable to limit the content of Ti to 0.005 to 0.03%. Meanwhile, more preferably, a lower limit of the content of Ti may be 0.007%, or an upper limit of the content of Ti may be 0.012%.

Niobium (Nb): 0.02 to 0.045%

Nb is the most effective element that may form significantly fine grains through rolling and cooling processes when a non-recrystallized region of an austenite region is widened at a high temperature due to a hot rolling solute drag and precipitate pinning effect. When a content of Nb is less than 0.02%, a range of an austenite non-recrystallization temperature region in steel becomes narrow, such that the grain size refinement effect is insignificant. On the other hand, when the content of Nb exceeds 0.045%, high-temperature strength is increased, which causes difficulties in hot rolling. Therefore, it is preferable to limit the content of Nb to 0.02 to 0.045%. Meanwhile, more preferably, a lower limit of the content of Nb may be 0.028%, or an upper limit of the content of Nb may be 0.044%.

Boron (B): 0.003% or less (excluding 0%)

B is an element added to prevent secondary processing brittleness due to the addition of P in steel. A content of B in the base steel sheet exceeds 0% to exhibit the effect of preventing the secondary processing brittleness described above. However, when the content of B exceeds 0.003%, the ductility of the steel sheet is deteriorated. Therefore, it is preferable to limit the content of B to 0.003% or less. Meanwhile, more preferably, a lower limit of the content of B may be 0.0004%, or an upper limit of the content of B may be 0.0015%.

Copper (Cu): 0.04 to 0.15%

Cu is an element added to secure strength, and is an element that is difficult to be removed when a steel composition is adjusted by steelmaking. Accordingly, it is preferable to add Cu in an amount of 0.04% or more in order to secure strength. However, when a content of Cu exceeds 0.15%, grain boundary embrittlement or an increase in cost occurs. Therefore, the content of Cu is limited to 0.15% or less. Meanwhile, more preferably, a lower limit of the content of Cu may be 0.069%, and an upper limit of the content of Cu may be 0.10%.

In addition, a balance of Fe and unavoidable impurities is contained. However, the addition of effective components other than the above composition is not excluded. Meanwhile, the unavoidable impurities may be contained as long as they may be unintentionally mixed in a common process of manufacturing a plated steel sheet. Those skilled in the art may easily understand the meaning, and thus it is not particularly limited thereto.

The present disclosure may effectively provide a high-strength and ultra-low carbon alloyed hot-dip galvanized steel sheet for an automotive outer panel having excellent formability by satisfying the component system described above.

That is, the present disclosure relates to an alloyed hot-dip galvanized steel sheet using ultra-low carbon steel as a basic component and a high-strength steel sheet containing P as a reinforcing element as a base material (base steel sheet) in order to improve formability. The present disclosure may effectively prevent linear defects expressed by segregation by containing P described above through appropriate control of the composition and alloying degree. Therefore, it is possible to provide a plated steel sheet that may be applied as a material for an automotive outer panel and has an excellent surface appearance and a method for manufacturing the same.

Meanwhile, according to an aspect of the present disclosure, the base steel sheet corresponds to ultra-low carbon steel having a content of C of 0.01% or less, and thus the base steel sheet may have a ferrite-based microstructure. In this case, the ferrite-based microstructure may include other structures that are unavoidably generated.

Specifically, according to an aspect of the present disclosure, the microstructure of the base steel sheet contains, by an area fraction, 95% or more of ferrite, and in addition, a small amount of pearlite or the like may remain. Alternatively, more preferably, the microstructure of the base steel sheet may contain, by an area fraction, 99% or more of ferrite and 1% or less of pearlite, and most preferably, the microstructure of the base steel sheet may be a ferrite single phase (containing 100% of ferrite).

Excellent formability may be secured by satisfying the microstructural characteristics described above. That is, when the content of the microstructure such as pearlite in the base steel sheet exceeds 5%, the formability may be deteriorated.

According to an aspect of the present disclosure, although not particularly limited, in the base steel sheet, an average grain size of the ferrite may be in a range of 5 to 15 μm (that is, 5 μm or more and 15 μm or less). When the average grain size of the ferrite is less than 5 μm, the strength is too high, and thus an elongation may not be sufficiently secured. In addition, when the average grain size of the ferrite exceeds 15 μm, the desired strength may not be secured. Meanwhile, although not particularly limited, in terms of further improving the effect described above, preferably, a lower limit of the average grain size of the ferrite may be 7 μm, or an upper limit of the average grain size of the ferrite may be 10 μm.

Here, the average grain size of the ferrite means an average value of values obtained by measuring equivalent circular diameters of the grains based on a cross section in a thickness direction (that is, a direction perpendicular to a rolling direction) of the plated steel sheet. More specifically, assuming a spherical particle drawn with the longest length penetrating the inside of the grain as a particle size, an average value of the measured values of the particle sizes is expressed.

Meanwhile, the plated steel sheet according to the present disclosure preferably satisfies the following Relational Expression 1:

$$1.6 \leq Mt/Ms \leq 6 \quad \text{[Relational Expression 1]}$$

(in Relational Expression 1, Mt represents an average content wt % of Mo at a point spaced apart from a surface of the base steel sheet in a thickness direction of the base steel sheet by 0.1 μm, Ms represents an average content wt % of Mo at a ¼t point from the surface of the base steel sheet in the thickness direction of the base steel sheet, and t represents a total average thickness of the base steel sheet and is in a range of 0.8 to 1 mm).

When the Mt/Ms value is less than 1.6, the linear defects on the surface may occur, and when the Mt/Ms value exceeds 6, the desired strength and elongation may not be secured. Meanwhile, although not particularly limited, in terms of further improving the effect described above, preferably, a lower limit of the Mt/Ms value may be 1.9, or an upper limit of the Mt/Ms value may be 4.9.

That is, as a result of conducting repeated studies, the present inventors have found that a plated steel sheet having excellent surface quality and high strength that may be suitably used for a material of an automotive outer panel may be manufactured by controlling a ratio of the content of Mo at an extreme surface layer portion of the base steel sheet (a point spaced apart from the surface of the base steel sheet in the thickness direction of the base steel sheet center by 0.1 μm) to the content of Mo at a surface layer portion of the base steel sheet (a ¼t point from the surface of the base steel sheet in the thickness direction of the base steel sheet center).

Therefore, Relational Expression 1 is satisfied, such that an application range of a high-strength cold-rolled steel sheet containing P to an automobile body may be expanded to a range that has never been applied (for example, a side outer or the like). As a result, it is possible to realize a further weight reduction of the automobile body.

Meanwhile, according to an aspect of the present disclosure, the plating layer may be a zinc plating layer or a zinc-alloyed plating layer. Although not particularly limited, the plating layer may have a composition containing, by wt %, 8 to 13% of Fe and a balance of Zn and unavoidable impurities, and excellent plating properties such as powdering may be secured by satisfying the composition. In this case, a content of Fe is a mass percentage of Fe in the plating layer relative to the entire plating layer, and refers to an average content mass % of Fe. The content of Fe in the plating layer may be measured by, for example, a method in which an alloyed hot-dip galvanized layer is dissolved in hydrochloric acid of inhibitors and an inductively coupled plasma (ICP) atomic emission spectrometry is used. When the content of Fe in the plating layer is less than 8%, an Fe—Zn alloy phase is not sufficiently formed, and a soft η-Zn phase remains in the plating surface layer, which may adversely affect workability and adhesiveness. In addition, when the content of Fe in the plating layer exceeds 13%, a problem may occur because a hard and weak Fe—Zn alloy phase (for example, a Γ phase or a Γ1 phase) is formed excessively thick at an interface between the plating layer and the base steel sheet and brittleness at the interface between the plating layer and the base steel sheet is thus promoted.

In addition, although not particularly limited, according to an aspect of the present disclosure, the plated steel sheet may satisfy the following Relational Expression 2. The present inventors have additionally found that securing the surface appearance has a close effect on a relationship between the contents of P and Mo. That is, Relational Expression 2 is satisfied, such that it is possible to effectively provide a plated steel sheet having an excellent surface appearance.

$$[P]/[Mo] \leq 1.162 \quad \text{[Relational Expression 2]}$$

(In Relational Expression 2, [P] represents an average content wt % of P in the base steel sheet, and [Mo] represents an average content wt % of Mo in the base steel sheet.)

According to an aspect of the present disclosure, a tensile strength of the plated steel sheet may be 390 MPa or more, and preferably may be in a range of 390 to 490 MPa. The tensile strength of the plated steel sheet satisfies 390 MPa or more (or 690 MPa or more and 490 MPa or less), such that it is possible to realize a weight reduction of an automobile using high-strength steel. Meanwhile, more preferably, a lower limit of the tensile strength of the plated steel sheet may be 400 MPa, or an upper limit of the tensile strength of the plated steel sheet may be 480 MPa.

In addition, according to an aspect of the present disclosure, a yield strength of the plated steel sheet may be 205 MPa or more, and more preferably may be in a range of 205 to 350 MPa. When the yield strength of the plated steel sheet is too low, surface defects such as dents may occur when applied to an automotive outer panel, and when the yield strength of the plated steel sheet is too high, the formability may be deteriorated.

According to an aspect of the present disclosure, an elongation of the plated steel sheet may be 28% or more, more preferably 28 to 43%, and most preferably 28 to 38%. The elongation of the plated steel sheet satisfies the above range, such that excellent formability and workability may be secured.

Next, a method for manufacturing a plated steel sheet will be described in detail. However, it does not necessarily mean that the plated steel sheet of the present disclosure should be manufactured by the following manufacturing method.

Another aspect of the present disclosure provides a method for manufacturing a plated steel sheet, the method including: performing continuous casting on steel containing, by wt %, 0.003 to 0.009% of C, 0.05% or less of Si, 0.4 to 1.0% of Mn, 0.04 to 0.09% of P, 0.01% or less of S, 0.005% or less of N, 0.1% or less of S·Al, 0.03 to 0.08% of Mo, 0.005 to 0.03% of Ti, 0.02 to 0.045% of Nb, 0.06 to 0.15% of Cu, 0.003% or less of B, and a balance of Fe and unavoidable impurities; reheating a slab obtained by the continuous casting; providing a hot-rolled steel sheet by hot rolling the reheated slab; coiling the hot-rolled steel sheet; providing a cold-rolled steel sheet by cold rolling the hot-rolled steel sheet; annealing the cold-rolled steel sheet; and hot-dip galvanizing the annealed cold-rolled steel sheet by immersing the annealed cold-rolled steel sheet in a zinc-based plating bath.

Meanwhile, the present inventors have conducted additional studies and have found that it is an important factor to appropriately control a continuous casting velocity according to a degree of concentration of P and Mo in the slab during continuous casting in order to provide a high-strength and high-formability plated steel sheet having a high yield percentage and an excellent surface appearance.

That is, according to an aspect of the present disclosure, the method for manufacturing a plated steel sheet preferably satisfies the following Relational Expression 3 during continuous casting. In this case, since the following Relational Expression 3 is a value obtained empirically, a unit may not be specifically determined, and it is sufficient when a unit (m/min) of Vc and units (wt %) of [P] and [Mo] are satisfied.

$$1 \leq Vc \leq 5 - [P]/[Mo]$$ [Relational Expression 3]

(In Relational Expression 2, Vc represents an average casting velocity during the continuous casting and a unit thereof is m/min, [P] represents an average content wt % of P in the slab, and [Mo] represents an average content wt % of Mo in the slab.)

In the present disclosure, when an average casting velocity Vc during the continuous casting is less than 1 m/min, P segregation on the surface is not sufficiently controlled, which may cause surface defects in a final product. In addition, the average casting velocity Vc during the continuous casting exceeds the value of 5−[P]/[Mo], the linear defects on the surface occur, which may cause deterioration of the surface quality. This is interpreted as the fact that as the casting velocity is increased, a cooling rate of the slab is non-uniform, thermal deformation of the surface of the slab due to cooling occurs or the amount of NbC precipitated near the surface layer becomes non-uniform, and thus crack susceptibility of the surface is increased, resulting in poor surface defects.

In addition, according to an aspect of the present disclosure, although not particularly limited, in the continuous casting, cooling may be performed with the amount of cooling water of 0.80 to 3.0 L/kg (more preferably, 0.80 to 1.91 L/kg). In the continuous casting, when the amount of cooling water is less than 0.80 L/kg, the cooling rate on the surface of the slab tends to be non-uniform, and the thermal deformation of the surface of the slab occurs or the amount of Ti—Nb composite precipitated near the surface layer becomes non-uniform, which causes an increase in crack susceptibility of the surface. Therefore, surface defects may occur. In addition, when the amount of cooling water exceeds 3.0 L/kg, solidification proceeds rapidly, and thus cracks in the cast surface may occur.

Meanwhile, according to an aspect of the present disclosure, the reheating of the slab may be performed in a range of 1,180 to 1,230° C. When the reheating temperature of the slab is lower than 1,180° C., a production problem may occur due to an FM section rolling load, and when the reheating temperature of the slab exceeds 1,230° C., surface scale defects may occur.

In addition, according to an aspect of the present disclosure, the hot rolling may be performed so that a finish rolling temperature is Ar3 or higher, and more specifically, may be performed in a range of 880 to 970° C. When the hot rolling is performed at lower than 880° C., the steel sheet is cooled to the Ar3 temperature or lower, that is, in a two-phase region, such that coarse grains are generated in the surface layer portion, and a grain size in the surface layer is non-uniform, which may ultimately cause a problem in distinctness of image. In addition, when the hot rolling is performed at higher than 970° C., the grain size may not be sufficiently fine, which may cause an insufficient final material. Meanwhile, although not particularly limited, in terms of further improving the effect described above, preferably, a lower limit of the finish rolling temperature may be 915° C., or an upper limit of the finish rolling temperature may be 940° C.

In addition, according to an aspect of the present disclosure, the coiling of the hot-rolled steel sheet may be performed at 600 to 640° C. When the coiling temperature is lower than 600° C., precipitates such as Ti(Nb)C are not sufficiently formed and solid solution carbon is increased, which affects a behavior such as recrystallization and grain growth during annealing. Therefore, a problem in securing desired strength and elongation may occur. In addition, when the coiling temperature exceeds 640° C., the surface may be deteriorated due to secondary scale generation. Meanwhile, although not particularly limited, in terms of further improving the effect described above, preferably, a lower limit of the coiling temperature may be 612° C., or an upper limit of the coiling temperature may be 635° C.

In addition, according to an aspect of the present disclosure, the hot-rolled steel sheet is subjected to a pickling process for removing scale on the surface of the hot-rolled steel sheet, and the pickled hot-rolled steel sheet is cold-rolled at a reduction ratio of 70 to 83%, such that a cold-rolled steel sheet may be obtained. When the reduction ratio during the cold rolling is less than 70%, a {111} texture is not sufficiently grown, which may cause deterioration of the formability. On the other hand, when the reduction ratio during the cold rolling exceeds 83%, a rolling roll road during on-site manufacturing is significantly large and the shape is deteriorated, which may cause problems. Meanwhile, although not particularly limited, in terms of further improving the effect described above, preferably, a lower limit of the reduction ratio during the cold rolling may be 71%, or an upper limit of the reduction ratio during the cold rolling may be 77%.

In addition, according to an aspect of the present disclosure, the annealing of the cold-rolled steel sheet may be performed at a temperature equal to or higher than a recrystallization temperature in a range of 740 to 830° C. As the annealing is performed at a temperature equal to or higher than the recrystallization temperature, deformation caused by rolling is removed, and the steel sheet is softened, such that workability may be improved. That is, when the annealing temperature is lower than 740° C., ferrite recrystallization is not completed, such that an elongation may be insufficient due to ultra-high strength. On the other hand, when the annealing temperature exceeds 830° C., after recrystallization is completed, grain growth proceeds, which may cause insufficient strength. Meanwhile, although not particularly limited, in terms of further improving the effect described above, preferably, a lower limit of the annealing temperature may be 742° C., or an upper limit of the annealing temperature may be 810° C.

According to an aspect of the present disclosure, the method for manufacturing a plated steel sheet may include, after cooling of the annealed cold-rolled steel sheet, hot-dip galvanizing the annealed cold-rolled steel sheet as it is in a continuous hot-dip galvanizing line. That is, the method for manufacturing a plated steel sheet may include hot-dip galvanizing the annealed cold-rolled steel sheet by immersing the annealed cold-rolled steel sheet in a zinc-based plating bath. In the present disclosure, the zinc-based plating bath refers to a plating bath containing an excessive amount of zinc (that is, 50 wt % or more and 100% or less). A composition of the zinc-based plating bath is not particularly limited, and may further contain Al or unavoidable impurities. A zinc-based plating bath commonly used in the art may be applied.

Thereafter, although not particularly limited, according to an aspect of the present disclosure, after the hot-dip galvanizing, an alloying heat treatment may be optionally performed in a range of 500 to 560° C. In this case, when the alloying heat treatment temperature is lower than 500° C., alloying is not sufficiently performed, and when the alloying heat treatment temperature exceeds 560° C., alloying is excessively performed, and embrittlement of the plating layer occurs, which may cause problems such as peeling of the plating by processing such as press. Meanwhile, although not particularly limited, in terms of further improving the effect described above, preferably, a lower limit of the alloying heat treatment temperature may be 520° C., or an upper limit of the alloying heat treatment temperature may be 545° C.

Meanwhile, according to an aspect of the present disclosure, although not particularly limited, the method for manufacturing a plated steel sheet may optionally further include performing skin pass rolling on the alloyed heat-treated steel sheet using a skin pass roll having a roughness Ra of 1.0 to 1.6 μm. In the skin pass rolling, when the roughness Ra of the skin pass roll is less than 1.0 μm, it may be difficult to secure distinctness of image to have an aesthetic surface after painting. In addition, in the skin pass rolling, when the roughness Ra of the skin pass roll exceeds 1.6 μm, a problem in pressability may occur.

In addition, according to an aspect of the present disclosure, the skin pass rolling may be performed at a reduction ratio of 0.6 to 1.2%. In the skin pass rolling, when the reduction ratio is less than 0.6%, a problem in shape correction may occur, and when the reduction ratio exceeds 1.2%, a yield strength may be excessively increased due to an increase in operating potential.

MODE FOR INVENTION

Examples

Hereinafter, the present disclosure will be described in more detail with reference to Examples. However, it should be noted that the following Examples are provided to describe the present disclosure by way of illustration, but are not intended to limit the scope of the present disclosure. This is because the scope of the present disclosure is determined by contents disclosed in the claims and contents reasonably inferred therefrom.

Experimental Example 1

The steel having the alloy composition shown in Table 1 was subjected to continuous casting so that the average casting velocity and the amount of cooling water shown in Table 2 were satisfied to obtain a steel slab having a thickness of 250 mm, and a surface of the slab was subjected to a scarfing treatment to 2 to 4 mm. The slab was reheated to 1,250° C., and then the reheated slab was hot-rolled, coiled, and cold-rolled under the conditions shown in Table 3, thereby obtaining a steel sheet having an average thickness of 0.85 mm. Subsequently, the steel sheet was subjected to continuous annealing and alloying hot-dip galvanizing by immersing the steel sheet in a zinc-based plating bath containing, by wt %, 0.121 to 0.133% of Al and a balance of Zn and unavoidable impurities, thereby manufacturing a plated steel sheet.

TABLE 1

| Steel type | C | Si | P | Mo | Mn | N | Al | Cu | S | Ti | Nb | B |
|---|---|---|---|---|---|---|---|---|---|---|---|---|
| Inventive Steel 1 | 0.004 | 0.025 | 0.048 | 0.05 | 0.48 | 0.0013 | 0.0347 | 0.08 | 0.0023 | 0.01 | 0.035 | 0.0008 |
| Inventive Steel 2 | 0.0038 | 0.03 | 0.051 | 0.053 | 0.51 | 0.0017 | 0.0361 | 0.07 | 0.0034 | 0.008 | 0.033 | 0.0004 |
| Inventive Steel 3 | 0.005 | 0.031 | 0.057 | 0.0576 | 0.48 | 0.0015 | 0.0355 | 0.08 | 0.0021 | 0.007 | 0.038 | 0.0006 |
| Inventive Steel 4 | 0.007 | 0.034 | 0.062 | 0.062 | 0.51 | 0.002 | 0.0345 | 0.069 | 0.003 | 0.009 | 0.028 | 0.0007 |
| Inventive Steel 5 | 0.0064 | 0.042 | 0.079 | 0.068 | 0.62 | 0.0013 | 0.0346 | 0.078 | 0.0028 | 0.012 | 0.045 | 0.0006 |
| Inventive Steel 6 | 0.006 | 0.032 | 0.082 | 0.072 | 0.61 | 0.0015 | 0.0390 | 0.08 | 0.0032 | 0.011 | 0.041 | 0.0008 |
| Inventive Steel 7 | 0.008 | 0.036 | 0.089 | 0.078 | 0.67 | 0.0013 | 0.0410 | 0.09 | 0.0021 | 0.008 | 0.044 | 0.0007 |
| Inventive Steel 8 | 0.0071 | 0.024 | 0.056 | 0.08 | 0.5 | 0.0017 | 0.0290 | 0.1 | 0.0015 | 0.01 | 0.034 | 0.0004 |
| Comparative Steel 1 | 0.014 | 0.03 | 0.07 | 0.015 | 0.8 | 0.0018 | 0.0354 | 0.13 | 0.0054 | 0.03 | 0.034 | 0.002 |
| Comparative Steel 2 | 0.004 | 0.1 | 0.09 | 0.01 | 0.5 | 0.0012 | 0.0389 | 0.02 | 0.0022 | 0.05 | 0.021 | 0.001 |
| Comparative Steel 3 | 0.0028 | 0.1 | 0.037 | 0.005 | 0.72 | 0.0018 | 0.0405 | 0.05 | 0.0028 | 0.02 | 0.02 | 0.008 |

TABLE 1-continued

| Steel type | C | Si | P | Mo | Mn | N | Al | Cu | S | Ti | Nb | B |
|---|---|---|---|---|---|---|---|---|---|---|---|---|
| Comparative Steel 4 | 0.012 | 0.15 | 0.045 | 0.001 | 0.9 | 0.002 | 0.0391 | 0.5 | 0.0032 | 0.045 | 0.012 | 0.007 |
| Comparative Steel 5 | 0.04 | 0.028 | 0.07 | 0.05 | 0.7 | 0.0025 | 0.0361 | 0.09 | 0.0028 | 0.015 | 0.038 | 0.0008 |

TABLE 2

| No. | Steel type | Vc* [m/min] | [P] | [Mo] | [Relational Expression 3] 5−[P]/[Mo] value | Wq* [L/kg] |
|---|---|---|---|---|---|---|
| Inventive Example 1 | Inventive Steel 1 | 1.01 | 0.048 | 0.05 | 4.04 | 0.85 |
| Inventive Example 2 | Inventive Steel 2 | 1.05 | 0.051 | 0.053 | 4.04 | 0.80 |
| Inventive Example 3 | Inventive Steel 3 | 1.06 | 0.057 | 0.0576 | 4.01 | 0.90 |
| Inventive Example 4 | Inventive Steel 4 | 1.07 | 0.062 | 0.062 | 4 | 0.82 |
| Inventive Example 5 | Inventive Steel 5 | 1.05 | 0.079 | 0.068 | 3.84 | 0.91 |
| Inventive Example 6 | Inventive Steel 6 | 1.09 | 0.082 | 0.072 | 3.86 | 0.80 |
| Inventive Example 7 | Inventive Steel 7 | 1.08 | 0.089 | 0.078 | 3.86 | 0.82 |
| Inventive Example 8 | Inventive Steel 8 | 1.08 | 0.056 | 0.08 | 4.3 | 0.85 |
| Comparative Example 1 | Comparative Steel 1 | 1.1 | 0.07 | 0.015 | 0.33 | 0.65 |
| Comparative Example 2 | Comparative Steel 2 | 1.5 | 0.09 | 0.01 | −4 | 0.5 |
| Comparative Example 3 | Comparative Steel 3 | 1.1 | 0.037 | 0.005 | −2.4 | 3.1 |
| Comparative Example 4 | Comparative Steel 4 | 0.7 | 0.045 | 0.001 | −40 | 2.5 |
| Comparative Example 5 | Comparative Steel 5 | 3.2 | 0.07 | 0.05 | 3.6 | 3.0 |
| Comparative Example 6 | Inventive Steel 1 | 4.2 | 0.048 | 0.05 | 4.04 | 2.3 |

Vc*: Average casting velocity during continuous casting
Wq*: Amount of cooling water during continuous casting

TABLE 3

| No. | FDT* | CT* | Cold rolling reduction ratio | Annealing temperature | GA alloying temperature |
|---|---|---|---|---|---|
| Inventive Example 1 | 915° C. | 622° C. | 77% | 770° C. | 520° C. |
| Inventive Example 2 | 932° C. | 620° C. | 77% | 765° C. | 525° C. |
| Inventive Example 3 | 940° C. | 618° C. | 77% | 780° C. | 525° C. |
| Inventive Example 4 | 930° C. | 615° C. | 71% | 750° C. | 530° C. |
| Inventive Example 5 | 920° C. | 620° C. | 71% | 742° C. | 530° C. |
| Inventive Example 6 | 925° C. | 635° C. | 75% | 800° C. | 545° C. |
| Inventive Example 7 | 930° C. | 612° C. | 75% | 810° C. | 545° C. |
| Inventive Example 8 | 933° C. | 622° C. | 71% | 790° C. | 520° C. |
| Comparative Example 1 | 942° C. | 710° C. | 72% | 810° C. | 530° C. |
| Comparative Example 2 | 923° C. | 690° C. | 70% | 720° C. | 530° C. |
| Comparative Example 3 | 911° C. | 618° C. | 70% | 780° C. | 530° C. |
| Comparative Example 4 | 880° C. | 620° C. | 70% | 780° C. | 530° C. |
| Comparative Example 5 | 930° C. | 611° C. | 78% | 810° C. | 535° C. |
| Comparative Example 6 | 935° C. | 622° C. | 77% | 770° C. | 520° C. |

FDT*: Finish rolling temperature
CT*: Coiling temperature

The yield strength (YS), the tensile strength (TS), and the elongation at break (T-El) of each of the plated steel sheets obtained by Inventive Examples 1 to 8 and Comparative Examples 1 to 4 described above were measured. The results are shown in Table 4. Specifically, a width, and a length and a thickness of a parallel portion of a test piece were measured, the test piece was mounted in a tensile tester, and after waiting until the test piece was broken, the yield strength, the tensile strength, and the elongation at break of the test piece were measured. The yield strength is limit stress when elastic deformation occurs and usually represents a value through a 0.2% offset, the tensile strength represents a value obtained by dividing the maximum load by the circular cross section, and the elongation at break represents the amount of deformation of the test piece after break in the tensile test in %. At this time, the case in which the tensile strength was 390 MPa or more and the elongation was 28% or more was evaluated as pass.

Meanwhile, as for the evaluation of the r value as an index of deep drawing processing, JIS No. 5 tensile test piece was taken from the alloyed hot-dip galvanized steel sheet in three directions of a parallel direction, a 45° direction, and a perpendicular direction in a rolling direction, and the r value of each test piece was measured. For example, the r value was measured by measuring a change value of the sheet thickness and a change value of the sheet width at the time of performing a tensile deformation of about 15% in the above tensile test, and obtaining a ratio of the change value of the sheet width to the change value of the sheet thickness. Then, when the r value of the parallel direction, the r value of the 45° direction, and the r value of the perpendicular direction in the rolling direction were set to $r_0$, $r_{45}$, and $r_{90}$, respectively, the case in which the r value was calculated from Relational Expression A using the r value in each direction and the r value was 1.2 or more was evaluated as pass.

$$r = r_0 + 2*r_{45} + r_{90}/4 \quad \text{[Relational Expression A]}$$

In addition, the surface linear defects are visually confirmed in the form of black lines, which may confirm the total number of linear defects per coil on a surface defect detector (SDD). The surface linear defects were evaluated as "good" and "poor" according to the following criteria.

Good: Number of linear defects on SDD is 100 or less

Poor: Number of linear defects on SDD exceeds 100

In addition, "Mt/Ms" as the Mo ratio calculated from Relational Expression 1 described above was measured using a glow discharge spectrometer (GDS). Specifically, the plating layer of the hot-dip galvanized test piece was removed through pickling, and then the content of Mo at the extreme surface layer portion of the base steel sheet (a point spaced apart from the surface of the base steel sheet in the thickness direction by 0.1 μm) was measured by GDS, thereby calculating an average content (Mt) of Mo at the extreme surface layer portion. In addition, the content of Mo at the surface layer portion of the base steel sheet (that is, a ¼t point from the surface of the base steel sheet in the thickness direction, at this time, t was 0.9 mm) was measured by GDS by performing polishing from the surface of the base steel sheet to ¼t in the thickness direction to calculate an average content (Ms) of Mo at the surface layer portion. A Mo concentration ratio (that is, Mt/Ms value) at the extreme surface layer portion and the surface layer portion of the thus obtained base steel sheet was measured. The results are shown in Table 4.

In addition, a microstructure of the cross section in the thickness direction (that is, a direction perpendicular to the rolling direction) of the plated steel sheet was observed with an optical microscope (OM), and it was confirmed that 99% or more of ferrite was contained in the microstructures of Inventive Examples 1 to 8 and Comparative Examples 1 to 6. At this time, an average grain size of the ferrite was measured. The results are shown in Table 4.

TABLE 4

| No. | YS [MPa] | TS [MPa] | T-El [%] | r value | Surface linear defects | [Relational Expression 1] | | | GS* [μm] |
| --- | --- | --- | --- | --- | --- | --- | --- | --- | --- |
| | | | | | | Mt* | Ms* | Mt/Ms | |
| Inventive Example 1 | 275 | 410 | 35 | 1.7 | Good | 0.1 | 0.05 | 2.0 | 7.2 |
| Inventive Example 2 | 250 | 415 | 35 | 1.6 | Good | 0.18 | 0.053 | 3.4 | 7 |
| Inventive Example 3 | 235 | 412 | 32 | 1.6 | Good | 0.28 | 0.0576 | 4.9 | 8 |
| Inventive Example 4 | 320 | 452 | 15 | 1.5 | Good | 0.13 | 0.062 | 2.1 | 4.5 |
| Inventive Example 5 | 311 | 445 | 17 | 1.4 | Good | 0.14 | 0.068 | 2.1 | 4 |
| Inventive Example 6 | 290 | 450 | 29 | 1.6 | Good | 0.28 | 0.072 | 3.9 | 6.9 |
| Inventive Example 7 | 300 | 451 | 32 | 1.6 | Good | 0.2 | 0.078 | 2.6 | 7.2 |
| Inventive Example 8 | 270 | 411 | 38 | 1.7 | Good | 0.15 | 0.08 | 1.9 | 8 |
| Comparative Example 1 | 360 | 510 | 20 | 1.1 | Poor | 0.013 | 0.015 | 0.9 | 4.6 |
| Comparative Example 2 | 620 | 694 | 8 | 0 | Poor | 0.01 | 0.01 | 1.0 | 3 |
| Comparative Example 3 | 225 | 356 | 39 | 1.9 | Poor | 0.0042 | 0.005 | 0.8 | 14 |
| Comparative Example 4 | 226 | 378 | 35 | 1.5 | Poor | 0.001 | 0.001 | 1.0 | 15 |
| Comparative Example 5 | 410 | 480 | 20 | 0.8 | Poor | 0.043 | 0.05 | 0.9 | 13 |
| Comparative Example 6 | 275 | 410 | 35 | 1.7 | Poor | 0.04 | 0.05 | 0.8 | 7.2 |

Mt*: Average content wt % of Mo at point spaced apart from surface of base steel sheet in thickness direction of base steel sheet by 0.1 μm
Ms*: Average content wt % of Mo at 1/4 t point from surface of base steel sheet in thickness direction of base steel sheet
GS* (grain size): Average grain size (average equivalent circular diameter) of ferrite based on cross section in thickness direction of plated steel sheet As shown in Table 4, all the cases of Inventive Examples 1 to 8 satisfying the alloy composition and manufacturing conditions of the present disclosure satisfied Relational Expression 1, and as a result of measuring the composition of the plating layer by dissolving the plating layer of each of the plated steel sheets in a hydrochloric acid solution and then analyzing the dissolved liquid by a wet analysis (ICP) method, it was confirmed that the plating layer was composed of 8 to 13% of Fe and a balance of Zn and other impurities in terms of wt %.

In all the cases of the plated steel sheets manufactured by Inventive Examples 1 to 8, a tensile strength was 390 MPa or more and the yield strength was 205 MPa or more, which showed that the strength properties were excellent, and an elongation was 28% or more, which showed that the formability was also excellent. In addition, it was confirmed that the r value was 1.2 or more, which showed that the deep drawability was excellent and the surface linear defects were prevented.

On the other hand, in the cases of Comparative Examples 1 to 6 that did not satisfy at least one of the alloy composition and manufacturing conditions of the present disclosure, it was confirmed that at least one of the properties described above was deteriorated compared to that of Inventive Examples of 1 to 8.

Figure 1:
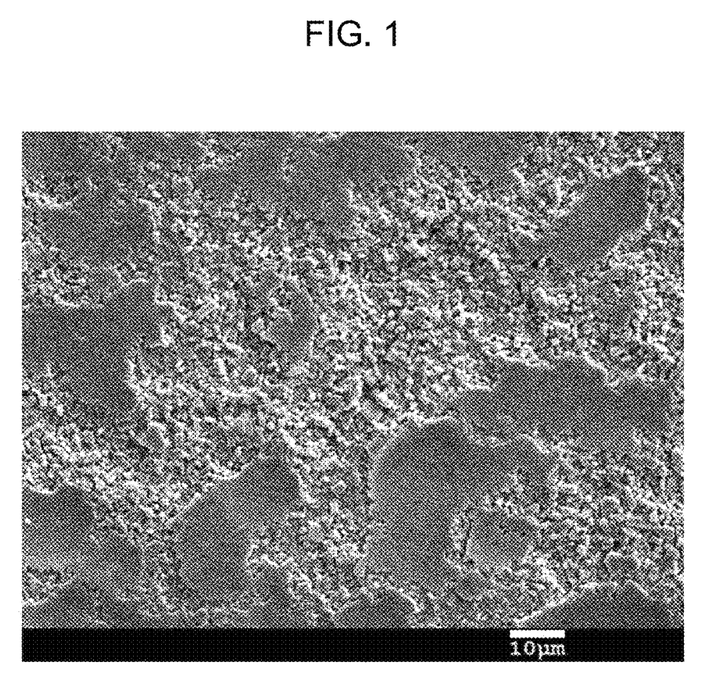
FIG. 1 illustrates a photograph obtained by observing a surface of a plated steel sheet manufactured by Inventive Example 1 of the present disclosure with a scanning electron microscope (SEM).
Figure 2:
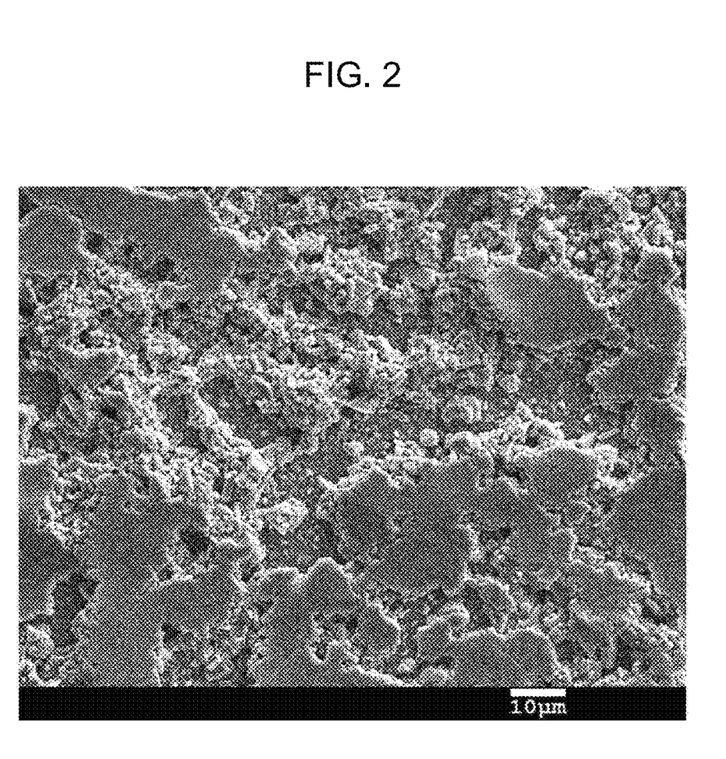
FIG. 2 illustrates a photograph obtained by observing a surface of a plated steel sheet manufactured by Comparative Example 4 of the present disclosure with a scanning electron microscope (SEM).

In particular, the photograph obtained by observing the surface of the plated steel sheet manufactured by Inventive Example 1 with a scanning electron microscope (SEM) is illustrated in FIG. 1. It was confirmed that alloying was uniformly performed. Meanwhile, the photograph obtained by observing the surface of the plated steel sheet manufactured by Comparative Example 4 with an SEM is illustrated in FIG. 2. It was confirmed that alloying was non-uniformly performed in Comparative Example 4. This is because in Comparative Example 4 that does not satisfy Relational Expression 3, as the P segregation section is increased, alloying delay occurs in the surface layer P segregation section, and alloying is non-uniformly performed. In addition, unlike FIG. 1, in FIG. 2, a dent portion where alloying was non-uniformly performed, such as a groove, was found, and it was visually confirmed that the appearance surface quality was deteriorated due to occurrence of a black color difference.

Experimental Example 2

The plated steel sheets obtained from Inventive Example 1 and Comparative Example 1 of Experimental Example 1 were additionally subjected to skin pass rolling using a skin pass roll having the roughness Ra under the conditions shown in Table 5.

TABLE 5

| | | Skin pass rolling | |
|---|---|---|---|
| Reference | No. | Skin pass roll roughness (Ra) [μm] | Reduction ratio [%] |
| Inventive Example 1-1 | Inventive Example 1 | 1.0 | 0.60 |
| Inventive Example 1-2 | | 1.60 | 1.20 |
| Inventive Example 1-3 | | 0.8 | 0.5 |
| Inventive Example 1-4 | | 1.8 | 1.3 |
| Comparative Example 1-1 | Comparative Example 1 | 3.0 | 1.4 |

The Mo ratio of Relational Expression 1, the plating layer surface roughness Ra, the ferrite area fraction, and the ferrite grain size of each of the plated steel sheets obtained from Inventive Examples 1-1 to 1-4 and Comparative Example 1-1 were measured. The results are shown in Table 6. In addition, the plated steel sheets obtained from Inventive Examples and Comparative Examples were evaluated by the same methods as those of Experimental Example 1. The results are shown in Table 6.

In addition, in order to evaluate the distinctness of image as a measure of aesthetic impression after painting, cupping was performed at a level of 17 mm, and waviness (Wsa) in the rolling direction starting from the center was measured. Cups were manufactured by pressing blanks of 225 mm×225 mm in a press with the power of a hollow punch having a diameter of 75 mm and a blank holder so that any material transfer of the substrate between the blank holder and the die was completely suppressed when measuring Wsa. The deformation of the cup was adjusted to 5%±0.2% of the thickness deformation rate of the bottom by setting the punch pulling depth to 17 to 18 mm. The case in which the Wsa value measured by the method described above was 0.35 μm or less was evaluated as "good," and the other cases were evaluated as "poor." The results are shown in Table 6.

TABLE 6

| Reference | [Relational Expression 1] | | | Plating layer surface roughness (Ra) [μm] | Ferrite area fraction [area %] | Ferrite grain average size [μm] | YS [MPa] | TS [MPa] | T-El [%] | r value | Surface linear defects | Distinctness of image |
|---|---|---|---|---|---|---|---|---|---|---|---|---|
| | Mt* | Ms* | Mt/Ms | | | | | | | | | |
| Inventive Example 1-1 | 0.1 | 0.05 | 2.0 | 1.1 | 100 | 7.2 | 275 | 410 | 35 | 1.7 | Good | Good |
| Inventive Example 1-2 | 0.1 | 0.05 | 2.0 | 1.24 | 100 | 7.2 | 289 | 408 | 35 | 1.6 | Good | Good |
| Inventive Example 1-3 | 0.1 | 0.05 | 2.0 | 1.18 | 100 | 7.2 | 270 | 410 | 35 | 1.7 | Good | Poor |

TABLE 6-continued

| | [Relational Expression 1] | | | Plating layer surface roughness (Ra) | Ferrite area fraction | Ferrite grain average size | YS | TS | T-El | r | Surface linear | Distinctness |
|---|---|---|---|---|---|---|---|---|---|---|---|---|
| Reference | Mt* | Ms* | Mt/Ms | [μm] | [area %] | [μm] | [MPa] | [MPa] | [%] | value | defects | of image |
| Inventive Example 1-4 | 0.1 | 0.05 | 2.0 | 1.58 | 100 | 7.2 | 350 | 409 | 35 | 1.7 | Good | Good |
| Comparative Example 1-1 | 0.1 | 0.05 | 2.0 | 0.48 | 100 | 7.2 | 370 | 512 | 21 | 1.15 | Poor | Good |

As shown in Table 6, in the cases of Inventive Examples 1-1 to 1-4 satisfying the alloy composition and manufacturing conditions of the present disclosure, it was confirmed that the tensile strength was 390 MPa or more and the yield strength was 205 MPa or more, which showed that the strength properties were excellent, and the elongation was 28% or more, which showed that the formability was also excellent. In addition, it was confirmed that the r value was 1.2 or more, which showed that the deep drawability was excellent and the surface linear defects were prevented.

In particular, among Inventive Examples described above, in the cases of Inventive Examples 1-1 and 1-2 in which a roughness Ra of a skin pass roll was in a range of 1.0 to 1.60 μm and a reduction ratio during skin pass rolling was in a range of 0.60 to 1.20%, it was confirmed that the distinctness of image was excellent due to the aesthetic surface after painting, and the pressability was excellent, compared to Inventive Examples 1-3 and 1-4, and the yield strength also satisfied a range of 205 to 340 MPa.

On the other hand, in the case of Comparative Example 1-1 that did not satisfy the alloy composition of the present disclosure, the tensile strength was too high and the elongation was low, which showed that the formability was deteriorated, and the r value was less than 1.2, which showed that the deep drawability was deteriorated and the surface linear defects occurred.

The invention claimed is:

1. A plated steel sheet comprising:
a base steel sheet; and
a plating layer formed on the base steel sheet,
wherein the base steel sheet contains, by wt %, 0.003 to 0.009% of C, 0.05% or less of Si, 0.4 to 1.0% of Mn, 0.04 to 0.09% of P, 0.01% or less of S, 0.005% or less of N, 0.1% or less of S·Al, 0.03 to 0.08% of Mo, 0.005 to 0.03% of Ti, 0.02 to 0.045% of Nb, 0.06 to 0.15% of Cu, 0.003% or less of B, and a balance of Fe and unavoidable impurities, and
the plated steel sheet satisfies the following Relational Expression 1:

$1.6 \leq Mt/Ms \leq 6$     [Relational Expression 1]

(in Relational Expression 1, Mt represents an average content wt % of Mo at a point spaced apart from a surface of the base steel sheet in a thickness direction of the base steel sheet by 0.1 μm, Ms represents an average content wt % of Mo at a ¼t point from the surface of the base steel sheet in the thickness direction of the base steel sheet, and t represents a total average thickness of the base steel sheet and is in a range of 0.8 to 1 mm).

2. The plated steel sheet of claim 1, wherein a microstructure of the base steel sheet contains, by an area fraction, 99% or more of ferrite and a balance of pearlite.

3. The plated steel sheet of claim 2, wherein an average grain size of the ferrite is 5 to 15 μm.

4. The plated steel sheet of claim 1, wherein the plated steel sheet has a tensile strength of 390 MPa or more and an elongation of 28 to 43%.

5. The plated steel sheet of claim 4, wherein the plated steel sheet has a yield strength of 205 MPa or more.

6. The plated steel sheet of claim 1, wherein the plating layer contains, by wt %, 8 to 13% of Fe and a balance of Zn and unavoidable impurities.

7. The plated steel sheet of claim 1, wherein the plated steel sheet satisfies the following Relational Expression 2:

$[P]/[Mo] \leq 1.162$     [Relational Expression 2]

(in Relational Expression 2, [P] represents an average content wt % of P in the base steel sheet, and [Mo] represents an average content wt % of Mo in the base steel sheet).

* * * * *